(12) United States Patent
Chen et al.

(10) Patent No.: US 12,204,450 B2
(45) Date of Patent: Jan. 21, 2025

(54) DYNAMIC CACHE RESOURCE ALLOCATION FOR QUALITY OF SERVICE AND SYSTEM POWER REDUCTION

(71) Applicant: MediaTek Inc., Hsinchu (TW)

(72) Inventors: Yu-Pin Chen, Hsinchu (TW); Jia-Ming Chen, Hsinchu (TW); Chien-Yuan Lai, Hsinchu (TW); Ya Ting Chang, Hsinchu (TW); Cheng-Tse Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 18/451,698

(22) Filed: Aug. 17, 2023

(65) Prior Publication Data
US 2024/0095168 A1   Mar. 21, 2024

Related U.S. Application Data

(60) Provisional application No. 63/375,701, filed on Sep. 15, 2022.

(51) Int. Cl.
*G06F 12/0811* (2016.01)
*G06F 12/084* (2016.01)

(52) U.S. Cl.
CPC ........ *G06F 12/0811* (2013.01); *G06F 12/084* (2013.01); *G06F 2212/1028* (2013.01)

(58) Field of Classification Search
None
See application file for complete search history.

(56) References Cited

U.S. PATENT DOCUMENTS

| | | | |
|---|---|---|---|
| 2005/0071701 A1* | 3/2005 | Luick | G06F 1/206 |
| | | | 712/E9.035 |
| 2014/0173207 A1* | 6/2014 | Wang | G06F 12/0802 |
| | | | 711/122 |
| 2015/0192980 A1* | 7/2015 | Sen | G06F 9/5094 |
| | | | 713/320 |
| 2022/0100247 A1 | 3/2022 | Garg et al. | |
| 2024/0095177 A1* | 3/2024 | Chen | G06F 12/0864 |

OTHER PUBLICATIONS

Cai et al. "Power Reduction of Multiple Disks Using Dynamic Cache Resizing and Speed Control." Oct. 2006. ACM. ISLPED '06. pp. 186-190.*
The Extended European Search Report, Application #EP23196780, mailed Feb. 16, 2024.

* cited by examiner

*Primary Examiner* — Nathan Sadler
(74) *Attorney, Agent, or Firm* — Tong J. Lee

(57) ABSTRACT

A computing system performs shared cache allocation to allocate cache resources to groups of tasks. The computing system monitors the bandwidth at a memory hierarchy device that is at a next level to the cache in a memory hierarchy of the computing system. The computing system estimates a change in dynamic power from a corresponding change in the bandwidth before and after the cache resources are allocated. The allocation of the cache resources are adjusted according to an allocation policy that receives inputs including the estimated change in the dynamic power and a performance indication of task execution.

20 Claims, 7 Drawing Sheets

DYNAMIC CACHE RESOURCE ALLOCATION FOR QUALITY OF SERVICE AND SYSTEM POWER REDUCTION

CROSS-REFERENCE TO RELATED APPLICATIONS

This application claims the benefit of U.S. Provisional Application No. 63/375,701 filed on Sep. 15, 2022, the entirety of which is incorporated by reference herein.

TECHNICAL FIELD

Embodiments of the invention relate to a computer system; more specifically, shared cache management in a computer system for balanced performance and power.

BACKGROUND OF THE INVENTION

Modern computer systems typically include a cache hierarchy consisting of multiple levels of caches to improve performance. Caches are small and fast memory units that serve as intermediaries between a central processing unit (CPU) and the main memory. Caches are typically implemented with static random-access memory (SRAM). Caches store a subset of frequently accessed data and instructions to reduce the average access time. The cache levels (L1, L2, L3, etc.) are designed to provide varying degrees of capacity, latency, and cost. The smaller, faster caches closer to the CPU store frequently accessed data, reducing the average access time. As the levels increase, storage capacity and access latencies also increase, but the hardware cost becomes cheaper.

In a computer system, the cache hierarchy is part of the memory hierarchy. Main memory is used to store the data and instructions that are not currently in the cache but are still required by the CPU. Main memory provides a larger capacity than caches but has higher access latencies.

Overall, cache and memory hierarchies are an essential component of modern computer architecture. There is a need for effective cache and memory management to improve the performance and power consumption of computer systems.

SUMMARY OF THE INVENTION

In one embodiment, a method is provided for a computing system to perform shared cache allocation. The method comprises allocating resources of a cache shared by groups of tasks executed in the computing system, and monitoring a bandwidth at a memory hierarchy device. The memory hierarchy device is at a next level to the cache in a memory hierarchy of the computing system. The method further comprises estimating a change in dynamic power from a corresponding change in the data bandwidth before and after the resources are allocated, and adjusting allocation of the resources according to an allocation policy that receives inputs including the estimated change in the dynamic power and a performance indication of task execution.

In another embodiment, a computing system is provided for allocating a cache shared by groups of tasks. The computing system comprises processors operative to execute the groups of tasks, the cache, and a memory hierarchy device that is at a next level to the cache in a memory hierarchy of the computing system. The computing system is operative to: allocate resources of the cache shared by the groups of tasks; monitor a bandwidth at the memory hierarchy device; estimate a change in dynamic power from a corresponding change in the data bandwidth before and after the resources are allocated; and adjust allocation of the resources according to an allocation policy that receives inputs including the estimated change in the dynamic power and a performance indication of task execution.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

Figure 1:
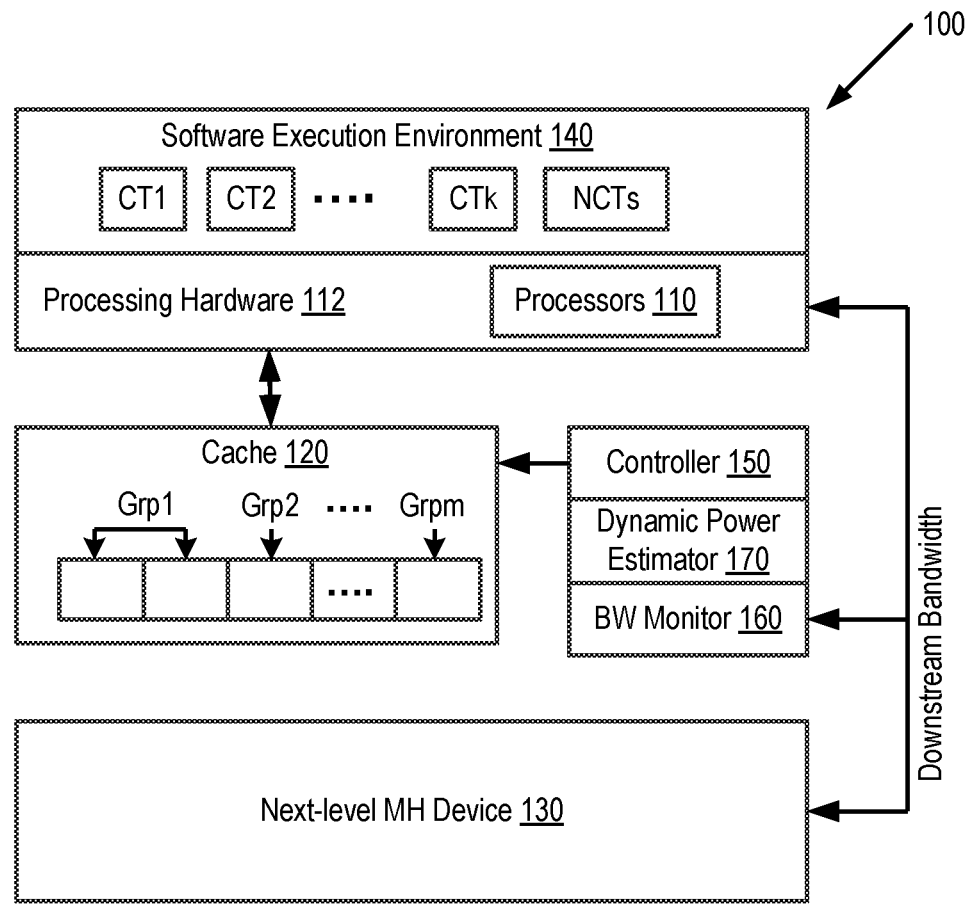
FIG. 1 is a block diagram illustrating a system operative to allocate a shared cache according to one embodiment.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention manage the usage of a shared cache, taking into consideration both performance and power. The cache is shared by multiple tasks executed by the processors in a computing system. Shared cache resources are allocated to the tasks based on the priorities of the tasks subject to the constraint of the bandwidth of a next-level memory hierarchy (MH) device. Examples of a next-level MH device include a next-level cache or a next-level memory, such as the main memory. The bandwidth indicates the data access rate (e.g., the average rate) from the processors of the computing system to the next-level MH device. The bandwidth can be measured or obtained during the task execution. An increase in the bandwidth indicates more data access to the next-level MH device, which in turn is an indication of increased activities of flushing and refilling in the shared cache. The bandwidth can be converted to dynamic power according to a power model. The dynamic power refers to the power consumed by accessing the next-level MH device. An increase in the bandwidth means an increase in the dynamic power. The change in dynamic power can be used as an index of power and performance trade-off. The shared cache allocation follows an allocation policy that uses the dynamic power change as input. The allocation policy aims at maintaining the dynamic power or a change in the dynamic power within a predetermined threshold, while keeping track of performance impacts on the shared cache.

Additionally or alternatively, the shared cache management follows a partial power-down policy to activate and deactivate inefficient regions of the shared cache. Deactivating a cache region means placing the region in a powered down state or a deep sleep mode, in which leakage power is suppressed or reduced. An example of an inefficient cache region is a region where a large number of cache misses occur. The cache region can be deactivated subject to the constraint of a reduction in the combined power, which is the combination of leakage power and dynamic power. The leakage power is calculated or estimated using an IC-specific power model based on the voltage and temperature measured at the shared cache. When the shared cache is partially deactivated, the leakage power may decrease but the dynamic power at the next-level MH device may increase. The system deactivates or maintains the deactivation of the cache region only if there is a power gain; that is, when the reduction in leakage power exceeds the increase in dynamic power.

FIG. 1 is a diagram illustrating an example of a system 100 operative to allocate a shared cache according to one embodiment. System 100 includes processing hardware 112, which further includes multiple processors 110. Each processor 110 may be a central processing unit (CPU) including multiple cores. Alternatively, each processor 110 may be a core in a processing unit such as a CPU, a graphic processing unit (GPU), a digital signal processor (DSP), a network processing unit (NPU), an artificial intelligence (AI) processing unit, or the like. Processors 110 execute transactions including critical transactions (CTs) and non-critical transactions (NCTs) in a software execution environment 140. A task may include one or more transactions. Examples of critical transactions include time-critical transactions; e.g., if its throughput impacts the performance of the task performing the transaction, such as data transactions of a rendering thread for a user-focused frame rendering task. All of the transactions in a critical task are critical transactions. In some embodiments, an interface is provided for a user to set any task as a critical task.

Critical transactions generally have stricter requirements with respect to the Quality of Service (QoS) and are given higher priorities than non-critical transactions. The transactions (CTs and NCTs) share the use of a cache 120, such as a static random-access memory (SRAM) device configured as a cache. In one embodiment, cache device 120 may be an on-chip cache that is co-located with processors 110; alternatively, cache 120 may be an off-chip cache. System 100 has a hierarchical memory structure in which cache 120 occupies a level of the memory hierarchy and is coupled to a next-level memory hierarchy (MH) device 130. Next-level MH device 130 occupies a higher level of the memory hierarchy and has a larger capacity than cache 120. Moreover, next-level MH device 130 is typically slower in terms of access speed than cache 120. In one embodiment, next-level MH device 130 may be a cache; alternatively, next-level MH device 130 may be part of the system or main memory such as a dynamic random-access memory (DRAM) device or another volatile or non-volatile memory device.

System 100 further includes a controller 150 to manage the allocation of cache 120. Controller 150 may be implemented by hardware circuits; alternatively, controller 150 may be implemented as software executed by processing hardware 112. Processors 110 execute tasks that include critical and/or non-critical transactions. Priorities may be assigned to task groups, tasks, and/or transactions based on the QoS requirements or other characteristics. Tasks/transactions having the same priority form a group (also referred to as "priority group"). Tasks/transactions in the same group have the same priority, and tasks/transactions in different groups have different priorities. It is understood that the term "group" as used herein (shown in FIG. 1 as "Grp") may be a group of tasks or a group of transactions of the same priority. Controller 150 allocates cache resources to the groups according to their priorities such that a higher-priority group may be allocated with more resources than a lower-priority group.

Figure 2:
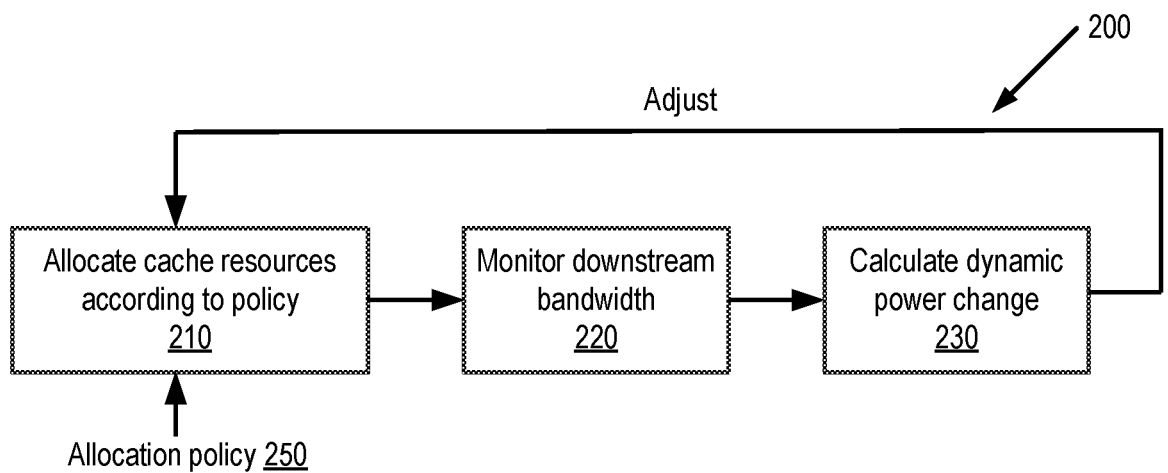
FIG. 2 illustrates a process of shared cache allocation according to one embodiment.

Referring also to FIG. 2, controller 150 allocates the cache resources according to an allocation policy 250 that takes inputs including performance indicators and dynamic power usage. Dynamic power usage may be estimated by monitoring the incoming bandwidth to next-level MH device 130, which is downstream from cache 120. In one embodiment, system 100 further includes a bandwidth (BW) monitor 160 to monitor and obtain the bandwidth of next-level MH device 130. The bandwidth may be monitored and measured per group; the per-group bandwidth may be used as a performance indicator (e.g., an indicator of cache misses) of that group. A dynamic power estimator 170 converts the bandwidth into dynamic power by using a power model. A higher bandwidth corresponds to a higher dynamic power.

Controller 150 may reduce the dynamic power by allocating more cache resources to a group that generates higher data traffic to next-level MH device 130. In one embodiment, controller 150 may adjust the cache allocation by increasing the allocated cache capacity to a first group that generates higher downstream traffic, and decreasing the allocated cache capacity to a second group that generates lower downstream traffic. The adjustment may be made without regard to the group priorities; e.g., the first group may have higher or lower priority than the second group. That is, a group is a resource allocation unit. A group may be set to any priority and different allocation policies may be applied to different groups. The cache allocation may be further adjusted if the allocation increases the downstream bandwidth for accessing next-level MH device 130, and therefore, increases the dynamic power to above a predetermined threshold. The cache allocation may be also adjusted when there is a need for trading performance of the tasks for dynamic power reduction.

FIG. 2 illustrates a process 200 of shared cache allocation according to one embodiment. Referring also to FIG. 1, system 100 may execute process 200 continuously and repeatedly in a loop; e.g., in a background process concurrently with execution of the tasks. Process 200 may start at step 210 with controller 150 allocating cache resources according to allocation policy 250. As mentioned previously, allocation policy 250 takes into account both performance (e.g., QoS requirements on transactions) and power (e.g., dynamic power). At step 220, bandwidth monitor 160 monitors and detects any change in the downstream bandwidth; i.e., the bandwidth of next-level MH device 130. The monitoring of the downstream bandwidth may be performed continuously in the background. At step 230, dynamic power estimator 170 calculates the corresponding change in the dynamic power when a change in the downstream bandwidth is detected. If an increase in the dynamic power exceeds a threshold, process 200 returns to step 210 to adjust the cache allocation to reduce the dynamic power. If the dynamic power increase is caused by a previous allocation that throttled a given priority group, controller 150 may increase the cache resource allocation to the given priority group. Additionally, the performance of the critical transactions is also monitored. In one embodiment, controller 150 may also adjust the cache allocation when the performance of any of the critical transactions is below a threshold.

In one embodiment, controller 150 allocates the cache resources with respect to cache size; that is, the cache storage capacity. The granularity of the cache allocation may be configurable in some embodiments. For example, cache 120 may be divided into multiple partitions of the same size (e.g., 1-megabyte partitions or 2-megabyte partitions, etc.). Controller 150 determines the ratios of partitions to be allocated to the priority groups. In the example of FIG. 1, the ratio of allocation between Grp1 and Grp2 is 2:1. Each partition may be a contiguous region of cache 120 or non-contiguous, such as a cache way. Cache 120 may be organized as multiple sets and multiple ways (i.e., "cache ways"), such as in an N-way set associative cache organization. In some embodiments, the cache allocation may be with respect to cache size, cache way, priority of cache replacement policy, cache bandwidth (for incoming data traffic to the cache), etc. In some embodiments, adjustment to the cache allocation may be achieved by throttling the cache usage for non-critical transactions. For example, cache 120 may be an N-way cache, and critical transactions may be allocated up to all of the N ways while non-critical transactions are allocated with a subset of the N ways. Alternatively, critical transactions may be allocated with X ways and non-critical transactions may be allocated with Y ways of cache 120, where X+Y=N. The number of ways allocated to the critical and non-critical transactions may be adjusted at runtime to keep the dynamic power within a predetermined threshold.

Figure 3:
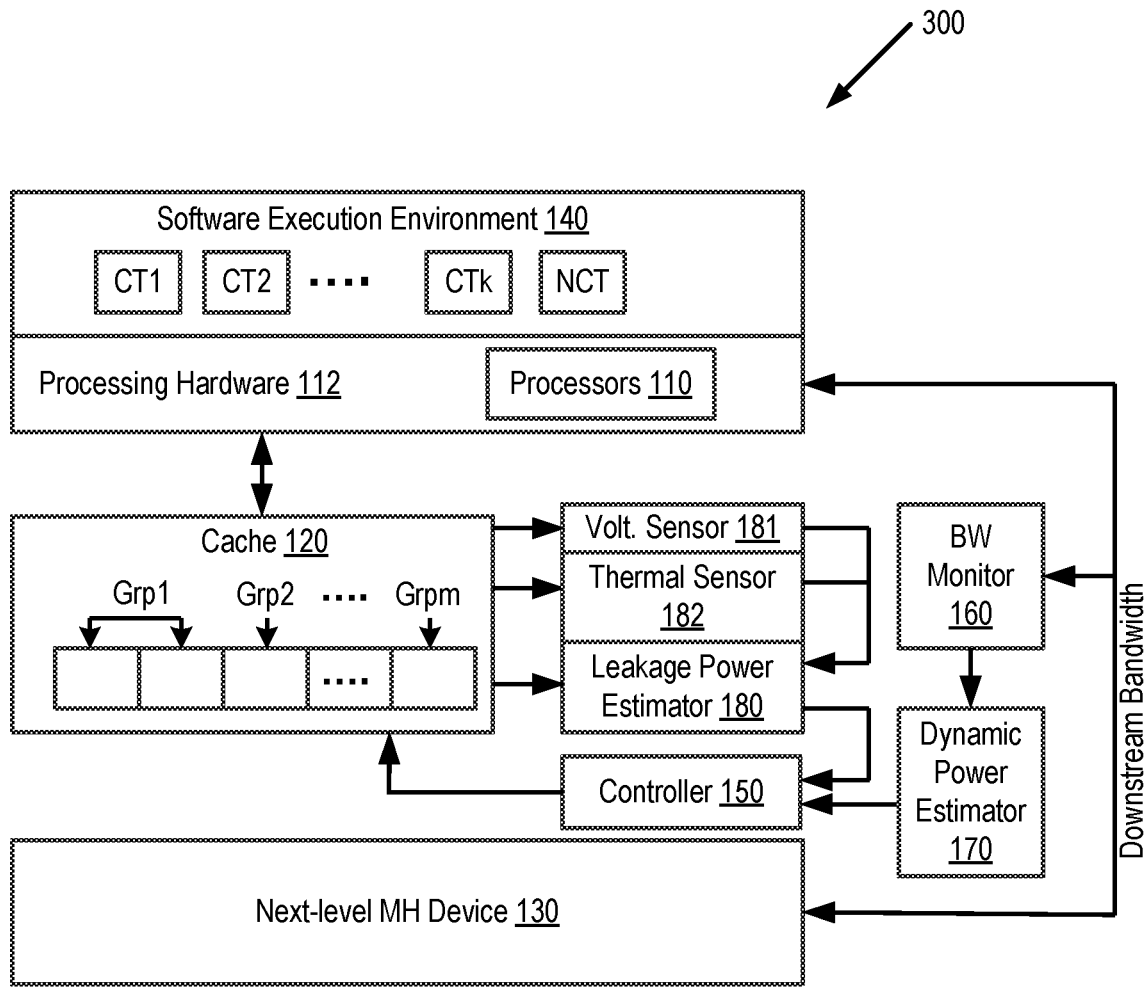
FIG. 3 is a diagram illustrating a system operative to manage partial cache deactivation according to one embodiment.

FIG. 3 is a block diagram illustrating a system 300 operative to manage partial cache deactivation according to one embodiment. The same reference numerals refer to the same elements in FIG. 1. In this embodiment, controller 150 manages cache 120 according to a partial power-down policy 450 (FIG. 4) in addition to allocation policy 250 (FIG. 2). To reduce the leakage power in cache 120, a region of cache 120 may be powered down (also referred to as "deactivated"). The deactivation may put the cache region into a deep sleep mode that consumes minimal and negligible amount of power. When there is a need for increasing the capacity of cache 120 (e.g., to reduce the number of cache misses), the deactivated region can be quickly activated to become operational.

System 300 estimates the leakage power of cache 120 based on the voltage and temperature measured at cache 120. In one embodiment, system 300 includes a voltage sensor 181 and a thermal sensor 182 to obtain the operating voltage and temperature of cache 120, respectively. System 300 further includes a leakage power estimator 180 to estimate the leakage power in cache 120 based on a leakage power model that addresses the specific hardware characteristics of cache 120. The leakage power model takes into account the operating voltage and temperature of cache 120. In this embodiment, controller 150 controls the usage of cache 120 based on inputs from both leakage power estimator 180 and dynamic power estimator 170.

Figure 4:
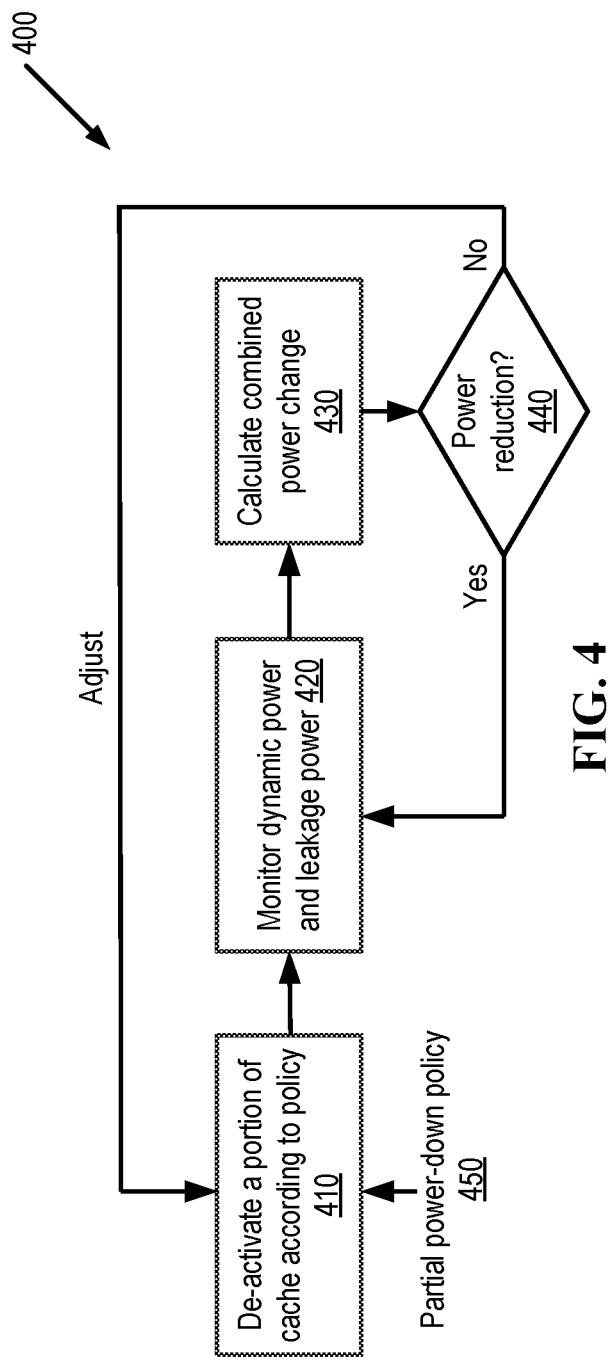
FIG. 4 illustrates a process of partial cache deactivation according to one embodiment.

FIG. 4 illustrates a process 400 of partial cache deactivation according to one embodiment. Referring also to FIG. 3, system 300 may execute process 400 continuously and repeatedly in a loop. Process 400 may start at step 410 with controller 150 deactivating a portion or a region of cache 120 according to partial power-down policy 450. The part of cache 120 being deactivated may be the least accessed region, the region where the most cache misses occur, or determined by another criterion. At step 420, system 300 monitors the dynamic power and the leakage power of cache 120. As mentioned before in connection with FIG. 2, the dynamic power may be estimated based on the downstream bandwidth. The leakage power is estimated with respect to the temperature and voltage of cache 120. When a portion of cache 120 is deactivated, the leakage power may decrease but the dynamic power may increase due to less cache capacity. At step 430, system 300 calculates the combined power change including the change in leakage power and the change in dynamic power. If, at step 440, the combined power change indicates a power reduction compared with before the partial cache deactivation, the partial cache deactivation stays and process 400 returns to step 420 to continue monitoring the leakage power and the dynamic power of cache 120. If the combined power change does not indicate a power reduction, then system 300 may adjust the partial cache deactivation at step 410; e.g., by re-activating a part or all of the deactivated portion of cache 120.

In one embodiment, one or more of bandwidth monitor 160, dynamic power estimator 170, and leakage power estimator 180 may be implemented by hardware circuits or software executed by processing hardware 112.

Figure 5:
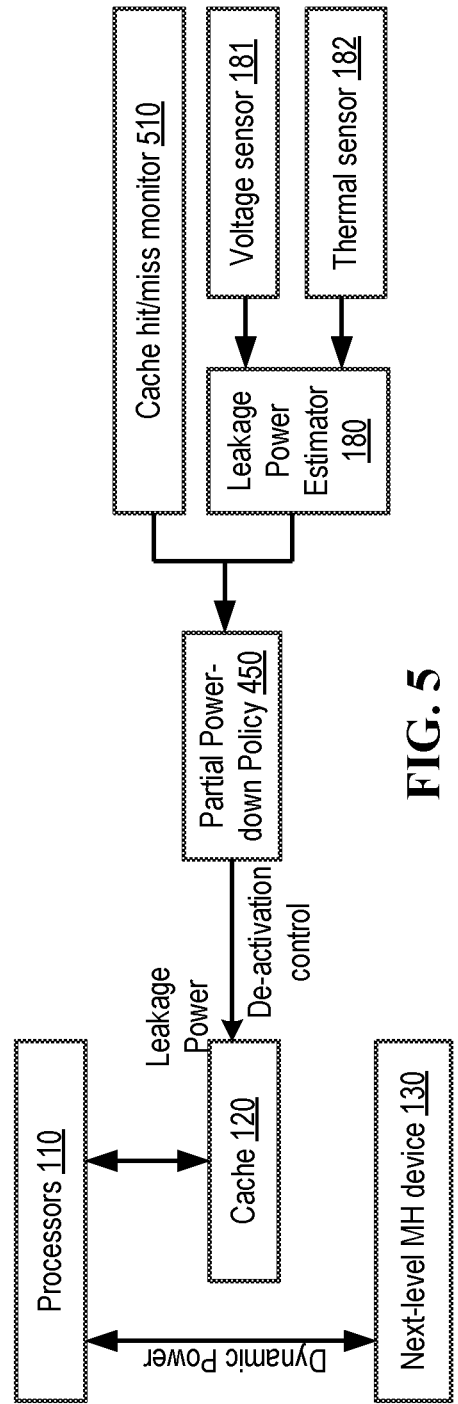
FIG. 5 is a block diagram illustrating a partial power-down policy according to one embodiment.

FIG. 5 is a block diagram illustrating partial power-down policy 450 according to one embodiment. As mentioned above with reference to FIG. 3 and FIG. 4, controller 150 manages the deactivation of cache 120 according to partial power-down policy 450. Inputs to partial power-down policy 450 may come from a cache hit/miss monitor 510 and leakage power estimator 180. Cache hit/miss monitor 510 counts the numbers of cache misses in multiple regions of cache 120. Cache hit/miss monitor 510 provides indications (e.g., a cache hit count) of whether a region of cache 120 can be a candidate for deactivation. For example, a cache line or region that has few cache hits (e.g., below a threshold) indicates under-utilization, and, therefore, may be deactivated with negligible performance impact. In one embodiment, re-activation of the cache line or region may be based on the cache miss count, which is an indication of increased power consumption and performance degradation. In one embodiment, cache deactivation and reactivation may also be determined based on the leakage power and the dynamic power, as will be described with reference to FIG. 7. Leakage power estimator 180 estimates the leakage power of cache 120 under the operating conditions including voltage (measured by voltage sensor 181) and temperature (measured by thermal sensor 182). The use of partial power-down policy 450 may reduce the leakage power of cache 120 while satisfying the constraint on cache misses.

Figure 6:
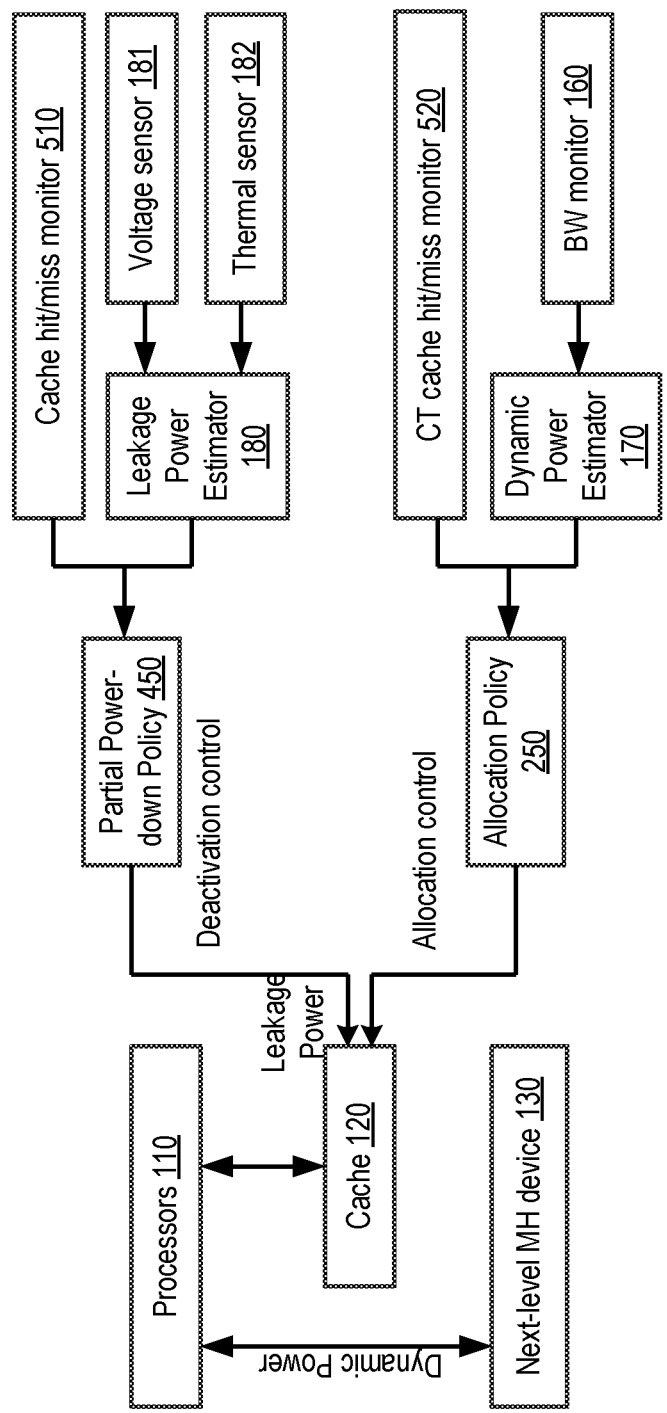
FIG. 6 is a block diagram illustrating policies for shared cache management according to one embodiment.

FIG. 6 is a block diagram illustrating policies for shared cache management according to one embodiment. As mentioned above with reference to FIG. 1-FIG. 5, controller 150 may manage the resources of cache 120 according to one of or both allocation policy 250 and partial power-down policy 450. Inputs to allocation policy 250 may come from a critical transaction (CT) cache hit/miss monitor 520 and dynamic power estimator 170. CT cache hit/miss monitor 520 counts the number of cache hits and/or misses encountered by the execution of critical transactions and tasks containing the critical transactions. CT cache hit/miss monitor 520 provides a performance indication of the critical transactions. In one embodiment, CT cache hit/miss monitor 520 may provide a cache miss count and/or a cache hit count for each priority group.

Dynamic power estimator 170 estimates the dynamic power caused by data access to next-level MH device 130. The dynamic power may be estimated based on the downstream bandwidth measured by bandwidth monitor 160. In one embodiment, dynamic power estimator 170 may estimate the dynamic power consumed by each priority group. For example, if the dynamic power ratio of Grp1 vs. overall dynamic power exceeds a predetermined value, more cache resources may be allocated to Grp1. If the dynamic power ratio of Grp1 vs. overall dynamic power is below a predetermined value, less cache resources may be allocated to Grp1. Thus, shared cache allocation according to allocation policy 250 can balance the performance of the critical transactions with the power consumed by accessing next-level MH device 130.

Shared cache management according to partial power-down policy 450 has been described above with reference to FIG. 5. With both allocation policy 250 and partial power-down policy 450, a system may balance the leakage power with the dynamic power in the control of a shared cache. Referring to FIG. 3, a system such as system 300 may follow partial power-down policy 450 to deactivate a portion of cache 120 and allocation policy 250 to allocate the activated portion of cache 120 to groups of tasks. Partial power-down policy 450 can reduce cache leakage power; allocation policy 250 can reduce dynamic power.

Figure 7:
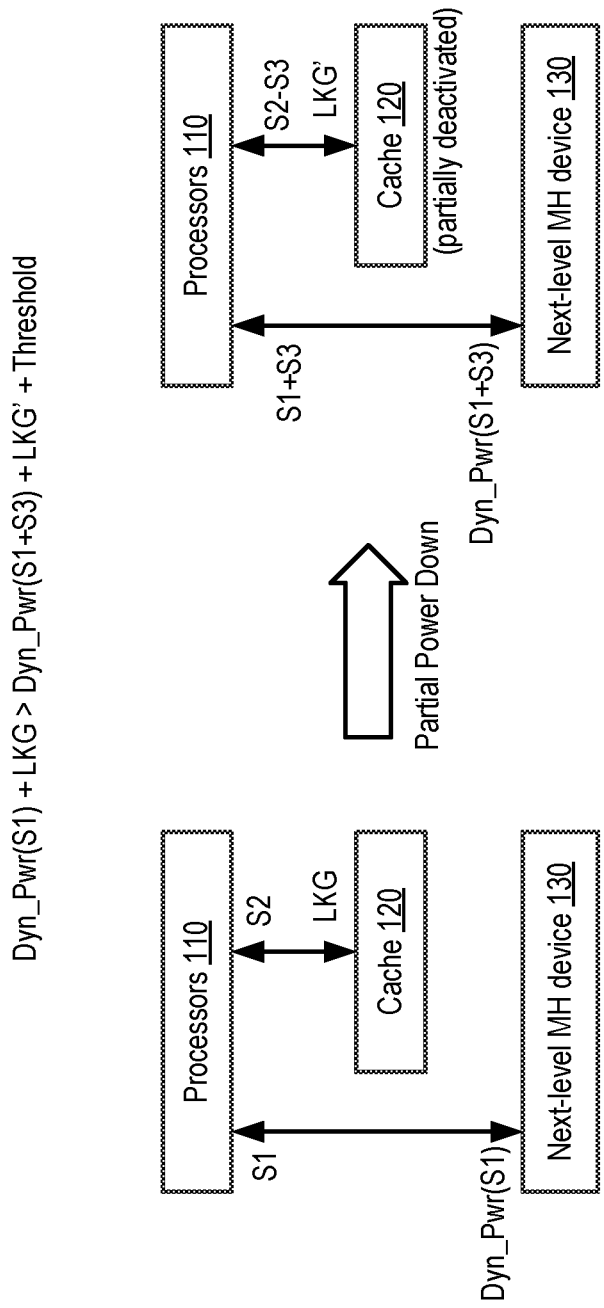
FIG. 7 is a diagram illustrating shared cache management for power reduction according to one embodiment.

FIG. 7 is a diagram illustrating shared cache management for power reduction according to one embodiment. Processor 110, cache 120, and next-level MH device 130 have been described with reference to FIG. 1. On the left of FIG. 7 shows that the bandwidth of next-level MH device 130 is S1, and the cache bandwidth is S2, where S1 and S2 are positive values. The dynamic power consumption is Dyn_pwr(S1) and the leakage power is LKG. After partially powering down (e.g., deactivating) a region of cache 120 as shown on the right of FIG. 7, the bandwidth of next-level MH device 130 increases to (S1+S3), and the cache bandwidth decreases to (S2−S3), where S3 is a positive value. The dynamic power consumption becomes Dyn_pwr(S1+S3) and the leakage power becomes LKG'. If Dyn_Pwr(S1)+ LKG>Dyn_Pwr(S1+S3)+LKG'+Threshold, the cache deactivation stays; otherwise, the deactivated cache size may be adjusted. The Threshold value may be zero or a positive number. For example, if the change indicates a power increase that exceeds Threshold, a portion or all of the cache region may be re-activated.

Figure 8:
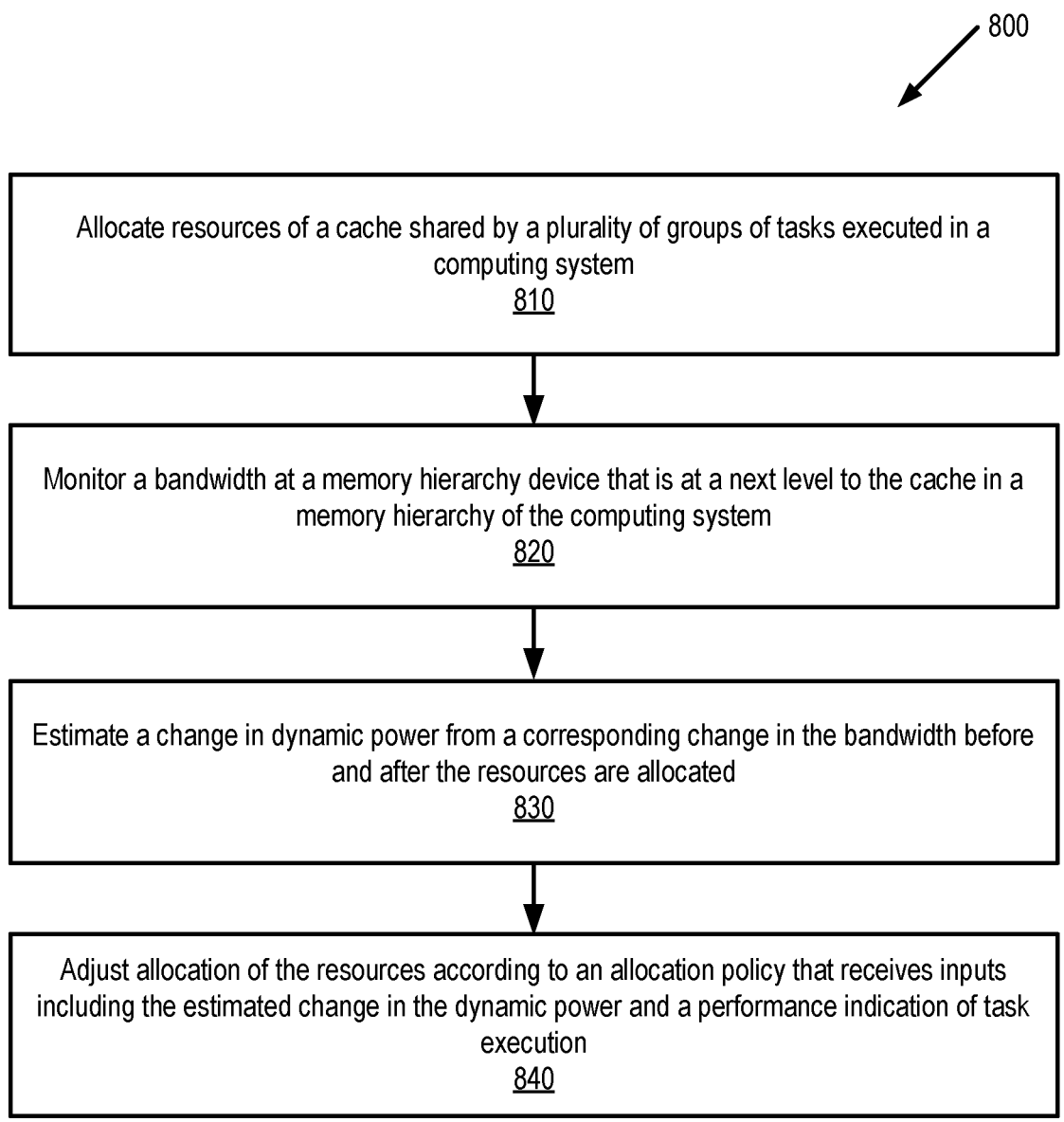
FIG. 8 is a flow diagram illustrating a method for shared cache allocation according to one embodiment.

FIG. 8 is a flow diagram illustrating a method 800 for shared cache allocation according to one embodiment. In one embodiment, method 800 may be performed by a computing system such as system 100 in FIG. 1 or system 300 in FIG. 3.

Method 800 starts with step 810 in which a computing system allocates resources of a cache shared by groups of tasks executed in a computing system. At step 820, the computing system monitors the bandwidth at a memory hierarchy device that is at a next level to the cache in a memory hierarchy of the computing system. At step 830, the computing system estimates a change in dynamic power from a corresponding change in the bandwidth before and after the resources are allocated. At step 840, the computing system adjusts the allocation of the resources according to an allocation policy that receives inputs including the estimated change in the dynamic power and a performance indication of task execution.

In one embodiment, the bandwidth indicates a data access rate from processors of the computing system to the memory hierarchy device. In one embodiment, the computing system performs the operations of monitoring, estimating, and adjusting while the groups of tasks are being executed. In one embodiment, the memory hierarchy device is a higher-level cache that has a higher capacity and lower speed than the cache. In an alternative embodiment, the memory hierarchy device is a main memory of the computing system.

In one embodiment, the computing system allocates the resources to the groups of tasks based on respective priorities of the groups, and adjusts the allocation of the resources such that the dynamic power is within a predetermined threshold. The resources being allocated may include partitions of the cache, cache bandwidth (which indicates a data access rate from processors of the computing system to the cache), and/or priorities for cache replacement. In one embodiment, the computing system allocates a first number of cache ways to critical transactions, and allocates a second number of cache ways to non-critical transactions. The critical transactions have a higher performance requirement than the non-critical transactions. The computing system may adjust the first number and the second number such that the dynamic power is within a predetermined threshold. In one embodiment, the computing system detects an increase in the bandwidth when the resources allocated to a given group of tasks is reduced. In response to a determination that the increase is greater than a threshold, the computing system increases the resources allocated to the given group of tasks.

Figure 9:
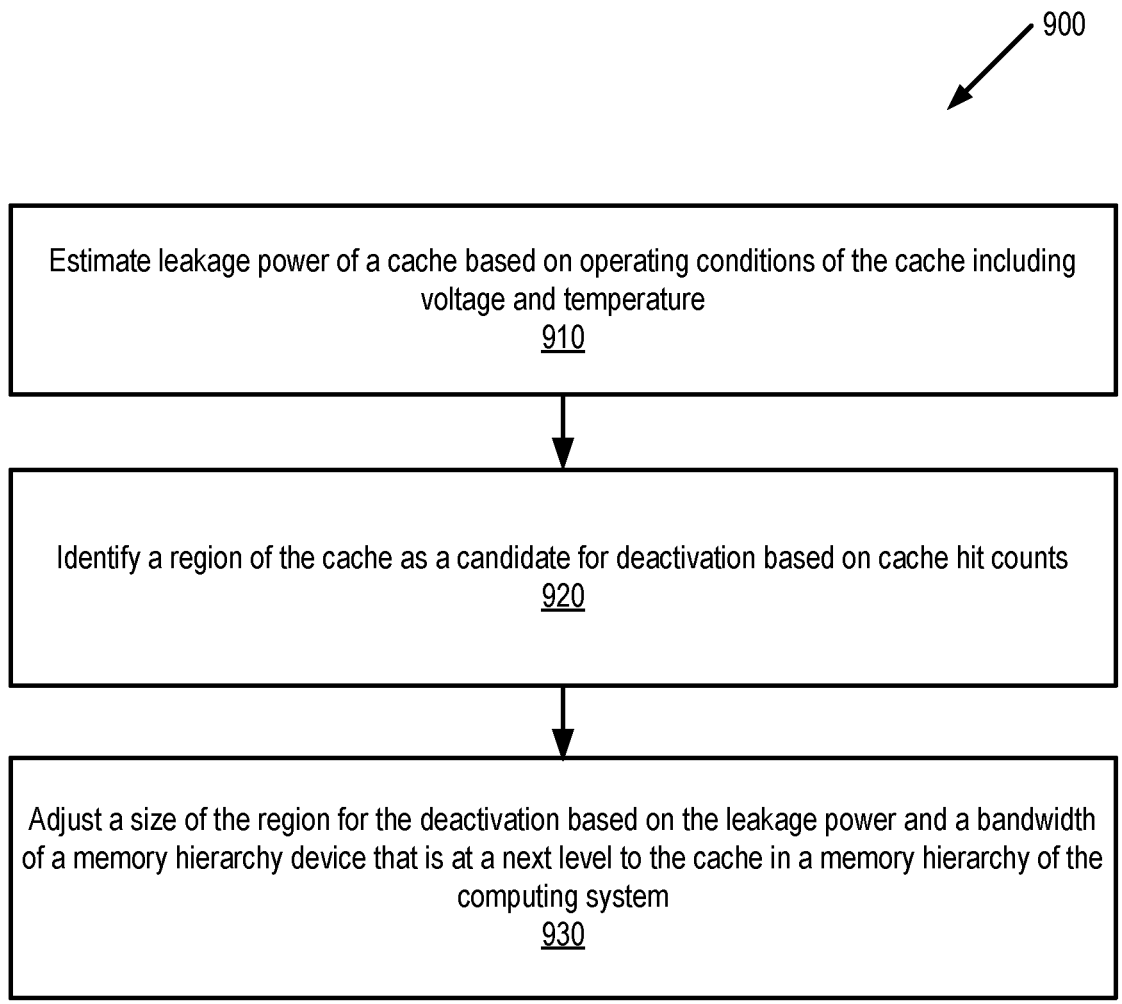
FIG. 9 is a flow diagram illustrating a method for partially deactivating a shared cache according to one embodiment.

FIG. 9 is a flow diagram illustrating a method 700 for partially deactivating a shared cache according to one embodiment. In one embodiment, method 700 may be performed by a computing system such as system 300 in FIG. 3.

Method 900 starts with step 910 in which a computing system estimates leak power of a cache based on operating conditions of the cache including voltage and temperature. At step 920, the computing system identifies a region of the cache as a candidate for deactivation based on cache hit counts. At step 930, the computing system adjusts a size of the region for the deactivation based on the leakage power and a bandwidth of a memory hierarchy device. The memory hierarchy device is at a next level to the cache in a memory hierarchy of the computing system.

In one embodiment, the computing system adjusts the size of the cache for the deactivation when at least one of the voltage and the temperature changes. In one embodiment, the computing system estimates dynamic power from the bandwidth of the memory hierarchy device, and calculates a combined change in the leakage power and the dynamic power before and after the deactivation of the region of the cache. The computing system re-activates at least a portion of the region if the combined change indicates a power increase that exceeds a threshold. In one embodiment, the computing system minimizes the power increase caused by the partial cache deactivation based on estimations of the leakage power and the dynamic power.

In one embodiment, the computing system periodically detects the voltage and the temperature of the cache, and adjusts an estimation of the leakage power based on the detected voltage and the detected temperature. The leakage power may be estimated using a leakage power model built specifically for a die that is used as the cache.

In one embodiment, the bandwidth indicates a data access rate from processors of the computing system to the memory hierarchy device. In one embodiment, the memory hierarchy device is a higher-level cache that has a higher capacity and lower speed than the cache. In an alternative embodiment, the memory hierarchy device is a main memory of the computing system.

The operations of the flow diagrams of FIG. 8 and FIG. 9 have been described with reference to the exemplary embodiments of FIG. 1 and FIG. 3. However, it should be understood that the operations of the diagrams of FIG. 8 and FIG. 9 can be performed by embodiments of the invention other than the embodiments of FIG. 1 and FIG. 3, and the embodiments of FIG. 1 and FIG. 3 can perform operations different than those discussed with reference to the flow diagrams. While the flow diagrams of FIG. 8 and FIG. 9 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuits in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method of a computing system for shared cache allocation, comprising:
   allocating resources of a cache shared by a plurality of groups of tasks executed in the computing system;
   monitoring a bandwidth at a memory hierarchy device that is at a next level to the cache in a memory hierarchy of the computing system;
   estimating a change in dynamic power from a corresponding change in the bandwidth before and after the resources are allocated; and
   adjusting allocation of the resources according to an allocation policy that receives inputs including the estimated change in the dynamic power and a performance indication of task execution.

2. The method of claim 1, wherein the bandwidth indicates a data access rate from processors of the computing system to the memory hierarchy device.

3. The method of claim 1, further comprising:
   performing operations of the monitoring, the estimating, and the adjusting while the groups of tasks are being executed.

4. The method of claim 1, wherein the memory hierarchy device is a higher-level cache that has a higher capacity and lower speed than the cache.

5. The method of claim 1, wherein the memory hierarchy device is a main memory of the computing system.

6. The method of claim 1, further comprising:
   allocating the resources to the groups of tasks based on respective priorities of the groups; and
   adjusting the allocation of the resources such that the dynamic power is within a predetermined threshold.

7. The method of claim 1, wherein the resources include a plurality of partitions of the cache.

8. The method of claim 1, wherein the resources include cache bandwidth, which indicates a data access rate from processors of the computing system to the cache.

9. The method of claim 1, wherein the resources include priorities for cache replacement.

10. The method of claim 1, further comprising:
    allocating a first number of cache ways to critical transactions;
    allocating a second number of cache ways to non-critical transactions, wherein the critical transactions have a higher performance requirement than the non-critical transactions; and
    adjusting the first number and the second number such that the dynamic power is within a predetermined threshold.

11. The method of claim 1, further comprising:
    detecting an increase in the bandwidth when the resources allocated to a given group of tasks is reduced; and
    in response to a determination that the increase is greater than a threshold, increasing the resources allocated to the given group of tasks.

12. A computing system operative to allocate a cache shared by a plurality of groups of tasks, comprising:
    processors operative to execute the groups of tasks;
    the cache; and
    a memory hierarchy device that is at a next level to the cache in a memory hierarchy of the computing system, wherein the computing system is operative to:
    allocate resources of the cache shared by the groups of tasks;
    monitor a bandwidth at the memory hierarchy device;
    estimate a change in dynamic power from a corresponding change in the bandwidth before and after the resources are allocated; and
    adjust allocation of the resources according to an allocation policy that receives inputs including the estimated change in the dynamic power and a performance indication of task execution.

13. The computing system of claim 12, wherein the bandwidth indicates a data access rate from processors of the computing system to the memory hierarchy device.

14. The computing system of claim 12, wherein the memory hierarchy device is a higher-level cache that has a higher capacity and lower speed than the cache.

15. The computing system of claim 12, wherein the memory hierarchy device is a main memory of the computing system.

16. The computing system of claim 12, wherein the computing system is further operative to:
    allocate the resources to the groups of tasks based on respective priorities of the groups; and adjust the allocation of the resources such that the dynamic power is within a predetermined threshold.

17. The computing system of claim 12, wherein the resources include a plurality of partitions of the cache.

18. The computing system of claim 12, wherein the resources include cache bandwidth, which indicates a data access rate from processors of the computing system to the cache.

19. The computing system of claim 12, wherein the resources include priorities for cache replacement.

20. The computing system of claim 12, wherein the computing system is further operative to:
- allocate a first number of cache ways to critical transactions;
- allocate a second number of cache ways to non-critical transactions, wherein the critical transactions have a higher performance requirement than the non-critical transactions; and
- adjust the first number and the second number such that the dynamic power is within a predetermined threshold.

* * * * *